(12) United States Patent
Bruno et al.

(10) Patent No.: US 11,362,964 B2
(45) Date of Patent: Jun. 14, 2022

(54) METHODS AND APPARATUS FOR SCHEDULING OF SERVICES IN A TRAFFIC-ENGINEERING NETWORK

(71) Applicant: TELEFONAKTIEBOLAGET LM ERICSSON (PUBL), Stockholm (SE)

(72) Inventors: Gianmarco Bruno, Genoa (IT); Daniele Ceccarelli, Sollentuna (SE); Francesco Lazzeri, Genoa (IT); Jeroen Nijhof, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 212 days.

(21) Appl. No.: 16/607,175

(22) PCT Filed: Apr. 27, 2017

(86) PCT No.: PCT/EP2017/060115
§ 371 (c)(1),
(2) Date: Oct. 22, 2019

(87) PCT Pub. No.: WO2018/196984
PCT Pub. Date: Nov. 1, 2018

(65) Prior Publication Data
US 2020/0389414 A1    Dec. 10, 2020

(51) Int. Cl.
*H04L 47/80* (2022.01)
*H04L 43/16* (2022.01)
(Continued)

(52) U.S. Cl.
CPC ............ *H04L 47/805* (2013.01); *H04L 43/16* (2013.01); *H04L 47/2408* (2013.01);
(Continued)

(58) Field of Classification Search
CPC ... H04L 47/805; H04L 43/16; H04L 47/2408; H04L 47/781; H04L 47/821; H04L 47/826
See application file for complete search history.

(56) References Cited

U.S. PATENT DOCUMENTS 9,438,508 B1    9/2016   Medved et al.
2017/0070426 A1  3/2017   Chen et al.

FOREIGN PATENT DOCUMENTS

WO    2016124228 A1    8/2016

OTHER PUBLICATIONS

Ceccarelli et al., "Framework for Abstraction and Control of Traffic Engineered Networks," TEAS Working Group, Internet Draft, Dec. 22, 2016.
(Continued)

*Primary Examiner* — Eric Myers
(74) *Attorney, Agent, or Firm* — Patent Portfolio Builders PLLC

(57) ABSTRACT

Apparatus and methods are provided for scheduling services in a traffic-engineered communications network. In one aspect a method comprises: receiving a request to schedule a second service utilizing the network in a second time period, wherein the second time period overlaps a first time period in which a first service utilizing the network has already been scheduled; and computing a path for the second service through the network. The step of computing the path for the second service through the network comprises: responsive to a determination that the request is received less than the threshold period of time before the start of the first time period, disallowing the second service from preempting the first service.

24 Claims, 5 Drawing Sheets

(51) Int. Cl.
*H04L 47/2408* (2022.01)
*H04L 47/78* (2022.01)
*H04L 47/70* (2022.01)

(52) U.S. Cl.
CPC .......... *H04L 47/781* (2013.01); *H04L 47/821* (2013.01); *H04L 47/826* (2013.01)

(56) References Cited

OTHER PUBLICATIONS

Farrel et al., "A Path Computation Element (PCE)-Based Architecture," Network Working Group, Request for Comments: 4655, Aug. 2006.
International Search Report and Written Opinion dated Oct. 9, 2017 in related/corresponding International Application No. PCT/EP2017/060115.
Vasseur et al., "Path Computation Element (PCE) Communication Protocol (PCEP)," Network Working Group, Request for Comments: 5440, Mar. 2009.
Zhuang et al., "Architecture for Scheduled Use of Resources," TEAS Working Group, Internet-Draft, Nov. 30, 2016.
Zhuang et al., "PCEP Extensions for LSP scheduling with stateful PCE," PCE Working Group, Internet-Draft, Dec. 22, 2016.

METHODS AND APPARATUS FOR SCHEDULING OF SERVICES IN A TRAFFIC-ENGINEERING NETWORK

TECHNICAL FIELD

Examples of the present disclosure relate to methods, apparatus and computer-readable media for scheduling of services in a traffic-engineered network.

BACKGROUND

In computer and telecommunication networks, a Path Computation Element (PCE) is the entity responsible for finding a suitable path in the network between a source node and a destination node. The path computation may be subject to one or more constraints for the path itself and/or the network as a whole (e.g. to optimize one or more performance parameters).

One recent application of the PCE is in the Abstraction and Control of Traffic-Engineered Networks (ACTN) networking paradigm, conceived to facilitate virtual network operation and the creation of a virtualized environment in which operators can view and control multi-subnet and multi-technology networks as a single virtualized network.

Traffic engineering is a process by which the performance of a network, such as a telecommunications network, is evaluated and optimized. Traffic-oriented performance parameters may include one or more of packet delay, packet delay variation, packet loss and throughput. Traffic engineering may seek to optimize one or more of these parameters (either locally or globally), and one of the functions by which such optimization may be achieved is the routing function, to steer traffic through the network in the most effective way. Thus PCEs play an important role in the efficient utilization of resources in traffic-engineered networks.

One known method of assigning resources to a particular session in a traffic-engineered network is the use of priorities. For example, each session or service may be assigned a "setup" priority and a "hold" priority. The setup priority is used in deciding whether the particular session can pre-empt another session, while the hold priority is used in deciding whether a particular session can be pre-empted by another session. In this context, when an established session is "pre-empted", the session is torn down or otherwise halted in favour of another session which utilizes some or all of the network resources which have become available as a consequence. A proposed session with a setup priority which is higher than the hold priority of an existing session may pre-empt that existing session. Therefore the priority values can be used to map the relative importance of sessions and co-ordinate the network accordingly. More important sessions are more likely to be established and more likely to be maintained than less important sessions.

Previous traffic-engineering solutions have operated in real time, with requests to establish new services and sessions being actioned immediately by the system. Thus a session may be set up (or not) immediately upon request, based on the priorities associated with the requested session and existing sessions, and the available resources in the network. Similarly, an existing session is liable to be halted at any time if a request is received to establish a higher-priority session and there are insufficient available resources to meet that request without pre-emption.

A recent improvement to traffic-engineered networking is the introduction of time scheduling to reserve connectivity resources at future times. By this mechanism, users can reserve future resources for a service corresponding to a path between a source node and a destination node. Priority values may be used in a similar way for these time-scheduled sessions, allowing less-important sessions to be pre-empted by more-important sessions. However, allowing the arbitrary pre-emption of time-scheduled paths can make the computation of paths even more complex. It is therefore desirable to mitigate the complexity of the path computation problem, particularly when that problem spans spatial dimensions (including multiple domains and technology layers) and the temporal dimension.

SUMMARY

One aspect of the disclosure provides a method in a path computation element for a traffic-engineered telecommunications network. The method comprises: receiving a request to schedule a second service utilizing the network in a second time period, wherein the second time period overlaps a first time period in which a first service utilizing the network has already been scheduled; and computing a path for the second service through the network. The step of computing the path for the second service through the network comprises: responsive to a determination that the request is received less than the threshold period of time before the start of the first time period, disallowing the second service from pre-empting the first service.

Another aspect provides a method in a path computation element for a traffic-engineered telecommunications network, The method comprises: during a first time period in which a first service is active on the network, receiving a request to schedule a second service utilizing the network in a second time period, wherein the second time period overlaps the first time period; and computing a path for the second service through the network. The step of computing the path for the second service through the network comprises, if the start of the second time period is less than the threshold period of time after the request was received, disallowing the second service from pre-empting the first service.

A further aspect provides a computer program comprising instructions which, when executed on at least one processor, cause the at least one processor to carry out a method as recited above.

A yet further aspect of the disclosure provides an apparatus for a traffic-engineered telecommunications network. The apparatus comprises a path computation element configured to: receive a request to schedule a second service utilizing the network in a second time period, wherein the second time period overlaps a first time period in which a first service utilizing the network has already been scheduled; and compute a path for the second service through the network. The path computation element is configured to compute the path for the second service through the network by, responsive to a determination that the request is received less than the threshold period of time before the start of the first time period, disallowing the second service from pre-empting the first service.

Another aspect provides an apparatus for a traffic-engineered telecommunications network. The apparatus comprises a path computation element configured to: during a first time period in which a first service is active on the network, receive a request to schedule a second service utilizing the network in a second time period, wherein the second time period overlaps the first time period; and compute a path for the second service through the network.

The path computation element is configured to compute the path for the second service through the network by, if the start of the second time period is less than the threshold period of time after the request was received, disallowing the second service from pre-empting the first service.

A further aspect of the disclosure provides an apparatus for a traffic-engineered telecommunications network. The apparatus comprising a processor and a memory. The memory contains instructions executable by the processor such that the apparatus is operable to: receive a request to schedule a second service utilizing the network in a second time period, wherein the second time period overlaps a first time period in which a first service utilizing the network has already been scheduled; and compute a path for the second service through the network. The apparatus is operable to compute the path for the second service through the network by, responsive to a determination that the request is received less than the threshold period of time before the start of the first time period, disallowing the second service from pre-empting the first service.

Another aspect provides an apparatus for a traffic-engineered telecommunications network. The apparatus comprises a processor and a memory. The memory contains instructions executable by the processor such that the apparatus is operable to: during a first time period in which a first service is active on the network, receive a request to schedule a second service utilizing the network in a second time period, wherein the second time period overlaps the first time period; and compute a path for the second service through the network. The apparatus is operable to compute the path for the second service through the network by, if the start of the second time period is less than the threshold period of time after the request was received, disallowing the second service from pre-empting the first service.

A further aspect provides an apparatus for a traffic-engineered telecommunications network. The apparatus comprises: a receiving module configured to receive a request to schedule a second service utilizing the network in a second time period, wherein the second time period overlaps a first time period in which a first service utilizing the network has already been scheduled; and a path computation module configured to compute a path for the second service through the network. The path computation module is operable to compute the path for the second service through the network by, responsive to a determination that the request is received less than the threshold period of time before the start of the first time period, disallowing the second service from pre-empting the first service.

A yet further aspect of the disclosure provides an apparatus for a traffic-engineered telecommunications network. The apparatus comprises: a receiving module configured to, during a first time period in which a first service is active on the network, receive a request to schedule a second service utilizing the network in a second time period, wherein the second time period overlaps the first time period; and a path computation module configured to compute a path for the second service through the network. The path computation module is configured to compute the path for the second service through the network by, if the start of the second time period is less than the threshold period of time after the request was received, disallowing the second service from pre-empting the first service.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
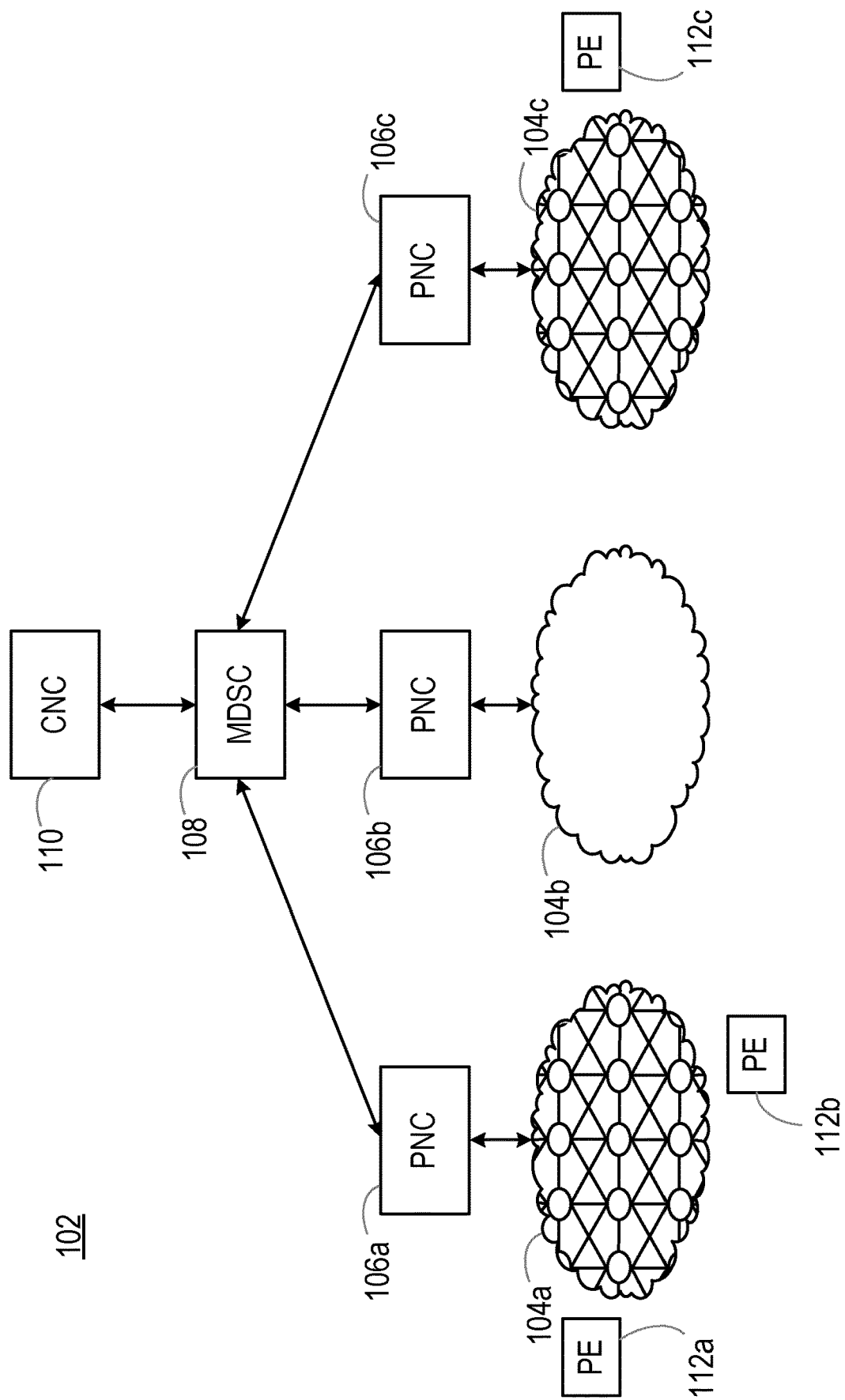
FIG. 1 is a schematic illustration of a network according to embodiments of the disclosure.

FIG. 1 shows a network 102 according to embodiments of the disclosure, and particularly the components concerned with the control of the network 102. In the illustrated embodiment, the components are arranged according to the ACTN paradigm, and ACTN terminology is used throughout the description of FIG. 1 and in other parts of the description. Those skilled in the art will appreciate that the concepts methods and apparatus described herein are equally applicable to other networking paradigms, and may be adapted straightforwardly for use in those networking paradigms. The embodiments disclosed herein are not limited to ACTN.

The network 102 comprises a plurality of domains 104a, 104b, 104c (collectively, 104), each managed by respective physical network controllers (PNCs) 106a, 106b, 106c (collectively, 106). The PNCs each communicate with a parent controller, which in the illustrated embodiment is termed a multi-domain service coordinator (MDSC) 108, and the MDSC 108 communicates with one or more clients via one or more customer network controllers (CNCs) 110 (although only a single CNC is shown in FIG. 1). First and second network nodes or path elements (PEs) 112a, 112b are coupled to domain 104a, while a third network node or PE 112c is coupled to domain 104c.

Each PNC 106 is responsible for the configuration of network elements within its respective domain 104, monitoring the physical topology of the domain 104, and communicating that topology to the MDSC 108. The physical topology may be communicated to the MDSC in raw (i.e. unprocessed) or abstracted (i.e. processed) formats. The PNCs 106 communicate with their respective domains 104 via respective southbound interfaces (SBIs), and with the MDSC 108 via respective MDSC-PNC interfaces (MPIs). In one embodiment, the messages communicated via the MPIs may be defined in terms of Yang and transported via the network configuration protocol. In other embodiments, different protocols may be employed. Each PNC 106 may also comprise a path computation element (PCE) responsible for the computation of paths between network nodes or path elements (PEs) in their domain, i.e. intra-domain paths. For example, PNC 106a may be responsible for computing a path between PE 112a and PE 112b.

The MDSC 108 receives topological information from each of the PNCs 106, and thus is able to build a single end-to-end network topology covering the entire network 102. The end-to-end network topology may be abstracted (i.e. processed) so as to provide a consistent overview of the network regardless of different technologies and protocols implemented in each of the domains 104. The MDSC 108 may communicate that harmonized view of the network to one or more CNCs via respective CNC-MDSC interfaces (CMIs). In one embodiment, the messages communicated via the CMIs may be defined in terms of Yang and transported via the network configuration protocol. In other embodiments, different protocols may be employed. The MDSC 108 may also receive requests from the CNCs 110 via the CMIs for the creation of new connections, the modification of existing connections or scheduled connections, or the removal of existing or scheduled connections.

The MDSC 108 thus enables management of the network 102 as a whole, allowing the maintenance of end-to-end services across multiple domains, the definition of virtual networks or slices across multiple domains, and additional services. The MDSC 108 may therefore comprise a PCE responsible for the computation of paths between network nodes or PEs in different domains, i.e. inter-domain paths. For example, the MDSC 108 may compute a path between PE 112a or PE 112b, and PE 112c.

Instances of PCEs can therefore be found in the PNCs as well as the MDSC. Embodiments of the disclosure therefore relate to PNCs, MDSCs, and any network element or node in which a path computation element may be found.

Embodiments of the disclosure relate to the application of first and/or second thresholds to determine whether a scheduled or established service may be pre-empted by another service that is to be scheduled. The first and second thresholds may be applied in addition to priority values, such as the setup and hold priority values discussed above.

For example, in one embodiment, a second service may be allowed to pre-empt a first service which is already scheduled, if the request to schedule the second service is received more than a first threshold period of time before the start of the first time period. If the request to schedule the second service is received less than the first threshold period of time before the start of the first time period, the second service is not allowed to pre-empt the first service.

In another embodiment, a request to schedule a second service may be received while a first service is already active. The second service may be allowed to pre-empt the first service if the requested start of the second service occurs at a time which is more than a second threshold period of time after the request to schedule the second service is received. If the requested start of the second service occurs at a time which is less than the second threshold period of time after the request is received, preemption of the first service by the second service may be denied.

The first and second thresholds may be implemented together or separately, and therefore embodiments of the disclosure include methods and apparatus in which the first threshold is applied alone, methods and apparatus in which the second threshold is applied alone, and methods and apparatus in which both the first and second thresholds are applied.

The computation of an appropriate path for a requested service can be complex, and in general will take into account multiple factors, as well as one or more of the thresholds discussed above. In some embodiments, the services may also be associated with priority values such as the setup and hold priorities discussed above. For example, if a requested second service has a lower priority than a first service which is already scheduled or already active, the existing priority algorithm may prevent pre-emption of the first service by the second service, regardless of the first and second thresholds discussed above. Conversely, if the second service has a higher priority than the first service, then one or both of the first and second thresholds may prevent pre-emption of the first service regardless of that higher priority.

Therefore the application of the first and/or second thresholds may take place as part of a wider path computation process, in which additional factors are taken into account such as one or more priority values associated with the first and second services; the source and destination nodes of the first and second services; available resources in the network, etc.

Figure 2:
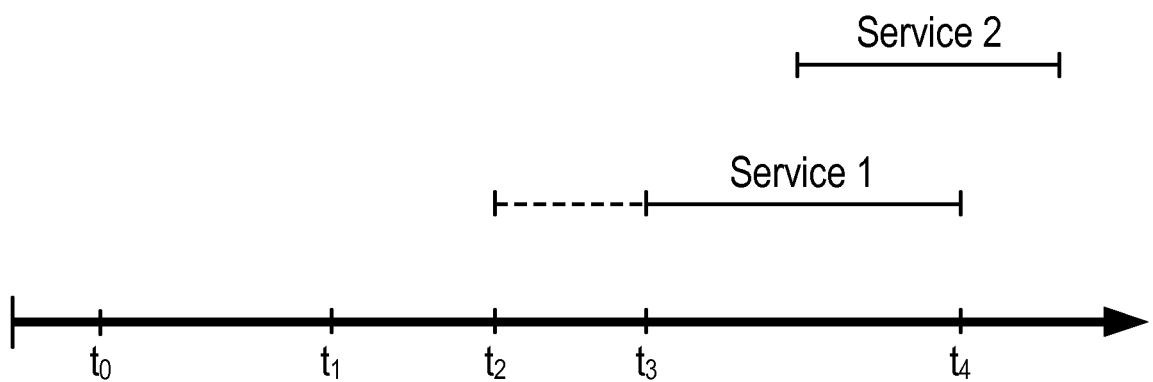
FIG. 2 is a timeline illustrating scheduling of services according to embodiments of the disclosure.

FIG. 2 is a timeline showing application of the first threshold discussed above.

At time $t_0$, a first service ("Service 1" in the Figure) is scheduled for a time period between future times $t_3$ and $t_4$. Thus service 1 is scheduled to be active (i.e. implemented and available to consumers) in the network in a first period of time, between times $t_3$ and $t_4$. This is shown by a solid line extending between times $t_3$ and $t_4$ in FIG. 2.

A request to schedule service 1 may have been received over the CMI interface, and define or request one or more parameters for the service, such as the start and end times for the service ($t_3$ and $t_4$), the source and destination nodes for the service, and the available bandwidth requested for the service. In some embodiments, service 1 may be indefinite, and therefore have no end time $t_4$. The request may also define or request a quality of service (QoS) for the service.

According to embodiments of the disclosure, the QoS comprises a first threshold period of time associated with the service. The first threshold period of time (also referred to herein as "the first threshold") extends before the scheduled start time $t_3$ of the service to an earlier time, $t_2$, and is illustrated by a dashed line in FIG. 2. The first threshold may be defined in any suitable manner. For example, the first threshold may be defined by reference to the time $t_2$ itself, by the length of the time period ($t_3$-$t_2$) or by some other parameter (e.g. a multiple of the period, $t_4$-$t_3$).

The QoS may also comprise one or more priority values associated with service 1, such as a setup priority and/or a hold priority.

Service 1 is thus scheduled, and associated with a path through a network, such as network 102, as well as resources reserved to meet the QoS requirements of the service. The path is between a source (or ingress) node and a destination (or egress) node, and may be intra- or inter-domain. The path may be a label-switched path (LSP), for example.

The path and associated parameters for the first service may be stored in the PCE responsible for computing the path (e.g. a PCE in the MDSC 108 in the case of inter-domain paths, or a PCE in a PNC 106 in the case of intra-domain paths). The path and associated parameters may also be propagated to other PCEs to enable the computation of paths for different services in future. For example, a PCE in a PNC 106a may forward to a PCE in the MDSC 108 the path and associated parameters for an intra-domain service in its respective domain 104a. In this way, a PCE in the MDSC 108 is enabled to carry out inter-domain path computation utilizing the resources of the domain 104a. Further sharing of resource information may be carried out between PCEs within PNCs 106 for different domains.

At time $t_1$, a request is received to schedule a second service ("Service 2") in a second period of time. The second period of time begins while the first service is scheduled to be active (i.e., between $t_3$ and $t_4$), and thus the second period of time partially overlaps the first period of time. In other embodiments, the second period of time may begin before the start of the first period of time and end after the start of the first period of time, or may overlap the first period of time completely. In other words, service 2 is requested to be active in the network at at least one time when service 1 is already scheduled to be active.

As with service 1, the request to schedule service 2 may define or request one or more parameters for the service. The one or more parameters may comprise one or more of: the start time for the service, the end time for the service, the source node for the service, the destination node for the service, and the available bandwidth requested for the service. In some embodiments, service 2 may be indefinite, and therefore have no end time. The request may also define or request a quality of service (QoS) for the service. The QoS may comprise a respective first threshold period of time for the service, and one or more priority values, such as a setup priority value and/or a hold priority value.

The PCE which receives the request to schedule the second service must therefore compute a path for the second service based on the parameters contained within the request. The computation of the path in general is a multi-factorial problem that takes into account multiple factors such as the source and destination for the path, any priorities associated with requested, established and scheduled services, the available resources in the network, etc.

According to embodiments of the disclosure, the first threshold period of time is applied to determine whether or not service 2 is allowed to pre-empt service 1. A new service, which is requested less than the first threshold period of time before the start of an already scheduled service, may be prevented from pre-empting that already scheduled service regardless of the relative priorities of the new and scheduled services. If the new service is requested more than the first threshold period of time before the start of the already scheduled service, then the new service is allowed to pre-empt the scheduled service. Thus the resources for the already scheduled service may be made available for the calculation of a path for the new service. Whether the new service actually does pre-empt the already scheduled service may depend on a number of further factors.

In the illustrated example, the request to schedule service 2 is received before $t_2$, i.e., more than the threshold period of time before the scheduled start time $t_3$ of service 1. Therefore service 2 is allowed to pre-empt service 1. If the request to schedule service 2 was received after $t_2$, i.e., less than the threshold period of time before the scheduled start time $t_3$ of service 1, then service 2 would be prevented from pre-empting service 1.

For illustrative purposes, here we assume that service 2 has a higher priority than service 1. For example, the setup priority for service 2 may be higher than the hold priority of service 1. Thus, based on that criterion, service 2 is allowed to pre-empt service 1, i.e. to utilize some or all of the resources reserved for service 1, and require that service 1 be de-scheduled. Thus the computation of a path for service 2 may utilize the resources that have previously been scheduled for service 1, i.e. service 2 is allowed to pre-empt service 1.

In some embodiments, the PCE may first attempt to compute a path for service 2 in which no pre-emption is required. For example, the PCE may attempt to compute a path for service 2 using only the resources that are available (i.e. not scheduled for use by another service) in the network. If no path is possible which meets the parameters requested for service 2, using that method, the PCE may then go on to attempt to compute a path for service 2 in which service 1 is pre-empted.

Thus FIG. 2 illustrates a method by which the computation of a path for a newly requested service may be limited to resources that are not previously scheduled for use by other services, provided that the request to schedule the new service is received more than a threshold period of time before those other services. The computation of a path for the new service is thus simplified.

Figure 3:
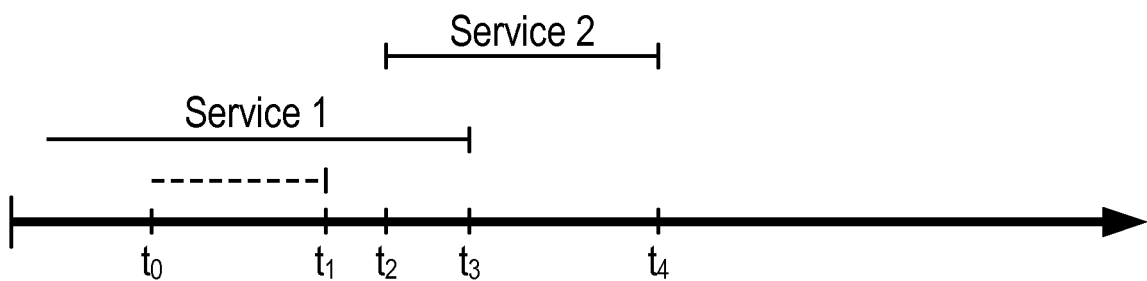
FIG. 3 is a timeline illustrating scheduling of services according to further embodiments of the disclosure.

FIG. 3 is a timeline showing application of the second threshold discussed above.

In this timeline, a first service ("service 1") is already active within the network, i.e. the network has been appropriately configured to provide resources for a path between a source node and a destination node. Service 1 may be associated with one or more parameters, such as one or more of: the path for service 1 (i.e. between a source node and a destination node), the resources being utilized by service 1 (e.g. the bandwidth), an end time of service 1 (unless the service is indefinite), and one or more priority values for service 1. For example, service 1 may be associated with a setup priority and/or a hold priority. In this example, service 1 is scheduled to end at time $t_3$. The time during which service 1 is scheduled to be active is termed the first period of time.

According to embodiments of the disclosure, service 1 is also associated with a second threshold period of time (termed "second" to distinguish it from the first threshold period of time discussed above). The second threshold period of time defines a period of time following receipt of a request to schedule a second service, after which the second service may pre-empt the first service.

At time $t_0$, a request is received at the PCE to schedule a second service ("service 2") in a second period of time. The second period of time begins at a time $t_2$ while the first service is scheduled to be active (i.e., before $t_3$) and ends at a time to while the first service is not scheduled to be active (i.e., after $t_3$), and thus the second period of time partially overlaps the first period of time. In other embodiments, the second period of time may begin and end before the end of the first period of time and thus overlap the first period of time completely. In other words, service 2 is requested to be active in the network at at least one time when service 1 is already scheduled to be active.

As with service 1, the request to schedule service 2 may define or request one or more parameters for the service. The one or more parameters may comprise one or more of: the start time for the service, the end time for the service, the source node for the service, the destination node for the service, and the available bandwidth requested for the service. In some embodiments, service 2 may be indefinite, and therefore have no end time. The request may also define or request a quality of service (QoS) for the service. The QoS may comprise a respective second threshold period of time for the service, and one or more priority values, such as a setup priority value and/or a hold priority value.

The PCE which receives the request to schedule the second service must therefore compute a path for the second service based on the parameters contained within the request. The computation of the path in general is a multi-factorial problem that takes into account multiple factors such as the source and destination for the path, any priorities associated with requested, established and scheduled services, the available resources in the network, etc.

According to embodiments of the disclosure, the second threshold period of time is applied to determine whether or not service 2 is allowed to pre-empt service 1. A new service, which is scheduled to begin less than the second threshold period of time after the request to schedule the new service is received, may be prevented from pre-empting that already active service regardless of the relative priorities of the new and scheduled services. If the new service is requested to begin at a time which is more than the second threshold period of time after the request is received, then the new service is allowed to pre-empt the active service. Thus the resources for the already active service may be made available for the calculation of a path for the new service.

Whether the new service actually does pre-empt the active service may depend on a number of further factors.

In the illustrated example, the second threshold period of time for service 1 begins at time $t_0$ (i.e. when the request to schedule service 2 is received) and ends at time $t_1$. Service 2 is requested to begin at time $t_2$, which is after $t_1$, and therefore service 2 is allowed to pre-empt service 1.

Whether service 2 actually does pre-empt service 1 may take into account a number of other factors. For example, the PCE may first attempt to compute a path for service 2 in which no pre-emption is required. For example, the PCE may attempt to compute a path for service 2 using only the resources that are available (i.e. not scheduled for use by another service) in the network. If no path is possible which meets the parameters requested for service 2 using that method, the PCE may then go on to attempt to compute a path for service 2 in which service 1 is pre-empted.

The PCE may also take into account priority values associated with service 1 and service 2. If service 2 has a lower priority than service 1, for example if the setup priority for service 2 is lower than the hold priority for service 1, then no pre-emption of service 1 by service 2 may be permitted. Conversely, if the setup priority of service 2 is higher than the hold priority of service 1, then pre-emption may be permitted. In that case, service 2 is allowed to pre-empt service 1, i.e. to utilize some or all of the resources currently being utilized by service 1, and require that service 1 be discontinued (e.g. torn down). Thus the computation of a path for service 2 may utilize the resources that are currently reserved for use by service 1, i.e. service 2 is allowed to pre-empt service 1.

Figure 4:
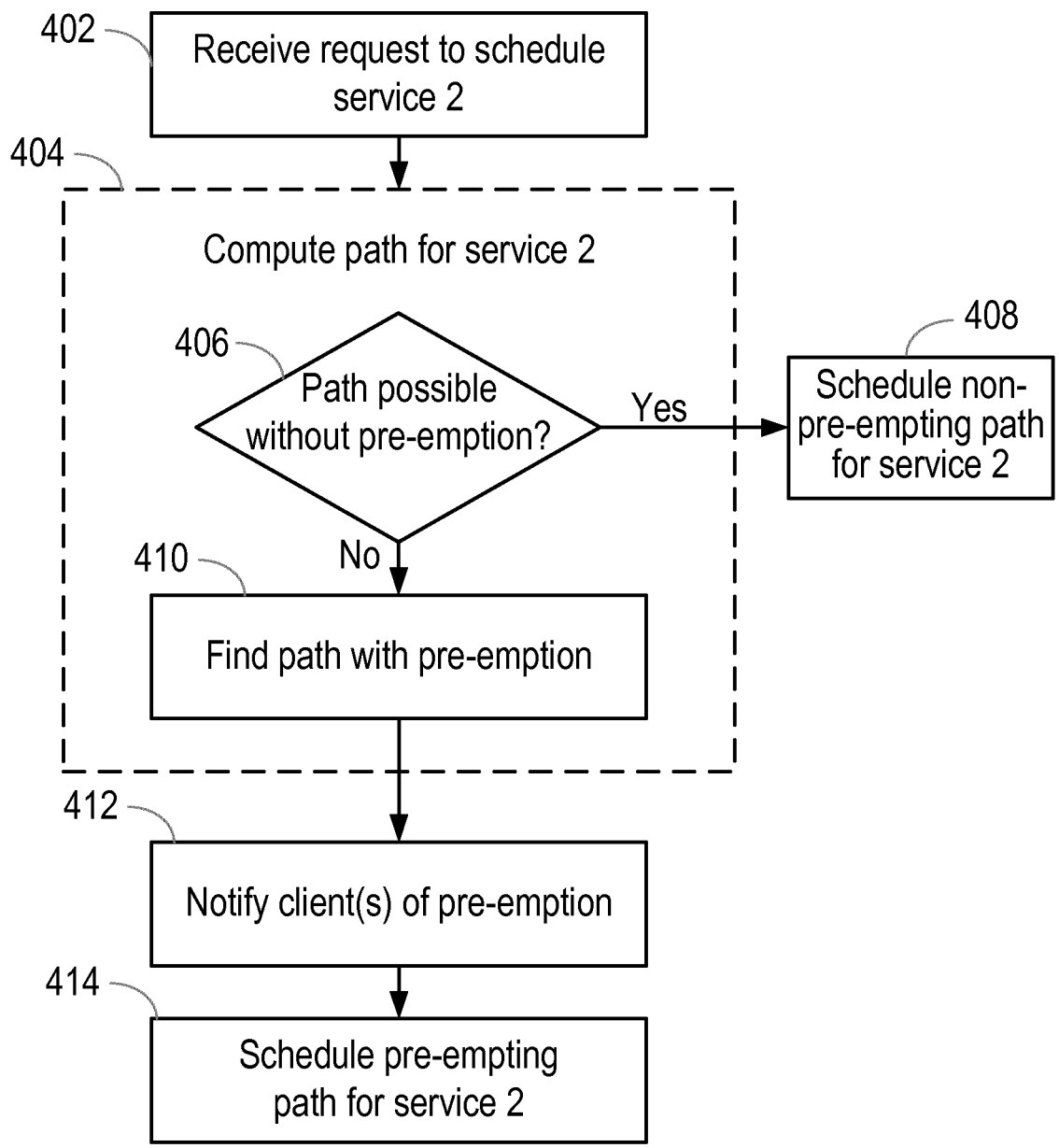
FIG. 4 is a flow chart of a method according to embodiments of the disclosure.

FIG. 4 is a flowchart of a method according to embodiments of the disclosure, for computing a path for a requested service. The method may be carried out in a PCE in a network node (such as a PNC 106 or MDSC 108) for a network. The network node may be a physical node or a virtual node (i.e. a virtual application running on a server).

In general, the network and the protocols implemented within it may allow for services to be scheduled to begin at some time in the future. Thus one or more services may be active on the network (i.e. established and routing traffic along a defined path) and/or scheduled on the network for the future. Each service which is active and/or scheduled may be associated with one or more parameters, such as a path between a source node and a destination node (e.g. a label switched path); resources required to operate the service on the path (e.g. a bandwidth); one or more priority values (e.g. such as a setup priority and/or a hold priority); and one or more threshold values (e.g. such as the first and second thresholds defined above). Each service (whether active or scheduled) and its associated parameters may be stored in the PCE which has responsibility for the domain or domains in which the service is active or scheduled. For example, if the service is intra-domain, the service and its parameters may be stored in a PCE instance running on a PNC associated with the domain, a PCE instance running on a MDSC which oversees the domain as well as other domains, or both. If the service is inter-domain, the service and its parameters may be stored in a PCE instance running on a MDSC which oversees the domains through which the path is established.

In step 402, the PCE receives a request to schedule a new service (termed "service 2"). The request may be received from a CNC, and actioned within the MDSC, or passed to a PNC and actioned there. The request may define one or more parameters, such as: a source node and a destination node within the network; a required bandwidth; one or more priority values (e.g. a setup priority and/or a hold priority); and one or more threshold values (e.g. the first and/or second thresholds defined above).

In step 404, the PCE computes a path for the requested new service. Techniques for computing paths are well known to those skilled in the art and are not described in detail herein. In general, the problem is a multi-factorial one which requires the optimization of a solution subject to one or more constraints. For example, the constraints may comprise one or more of: the source and destination nodes; the available resources in the network.

In one embodiment, step 404 comprises the sub-step 406 of determining first whether a path is possible for the new service in which no existing or scheduled service is pre-empted. Thus, in this instance, the path computation problem may consider as a constraint the network resources which are not previously committed to an active service or a scheduled service at the times for which the new service is requested, i.e. the available resources. In such embodiments, the goal of the path computation is to avoid pre-emption where possible, so as to avoid disruption to existing and previously scheduled services (which would require new paths to be computed, etc). Therefore, if a path is possible without pre-emption, the process moves to step 408, in which the new service is scheduled with the non-pre-empting path. The PCE may also store the new service and its associated parameters, and/or forward such information to the MDSC, to be used in the computation of paths for future services that may be requested.

If no path is possible for the new service without pre-empting one or more existing or scheduled services, the method moves to step 410 in which the path computation algorithm is performed again, using resources that are already in use by one or more existing services, or that are already scheduled for use by one or more services. Thus the multi-factorial algorithm is repeated, but using the more relaxed constraint in which the available resources include those resources allocated to existing or scheduled services which can be pre-empted. Further detail concerning whether resources for a particular service can be utilized in this algorithm can be found below in the description of FIG. 5.

Of course, it may be that no path is possible for the new requested service, even with the more relaxed constraints described above. In that case, communication may be required with the client for the new service to the effect that the requested service cannot be implemented within the network. The client may submit a new request in which priority values are increased, to increase the likelihood that a path can be found for the new service, or find some alternative solution for the service (such as an alternative network provider).

Here we assume that a suitable path can be found for the new requested service, using the more relaxed constraints afforded by pre-emption of one or more existing or scheduled services. The process moves to step 412, in which the clients for the pre-empted services are notified that their service (whether active or scheduled) has been pre-empted by another service. For example, an automated message may be sent to the client via a CNC. The client may then be able to seek an alternative solution for their pre-empted service, such as an alternative network provider or network. The notification message may include an expected start time of the pre-empting service, or a time at which the existing service is to be torn down.

In step 414, the pre-empting path is scheduled for the newly requested service. As in step 408, the PCE may also store the new service and its associated parameters, and/or forward such information to the MDSC, to be used in the computation of paths for future services that may be requested.

FIG. 4 thus shows a method in which a path is computed for a newly requested service. In the illustrated embodiment, it is first determined whether a path is possible for the requested service that does not require pre-emption and, if so, this path is used in preference to other paths. However, in alternative embodiments different criteria may be specified. For example, it may be found that an optimal path for the new service, regardless of whether that path pre-empts one or more active or scheduled services, leads to optimal usage of the network. Thus the PCE may compute a path for the requested service based on the available resources including those available via pre-emption, without first determining whether a path is possible without pre-emption.

Figure 5:
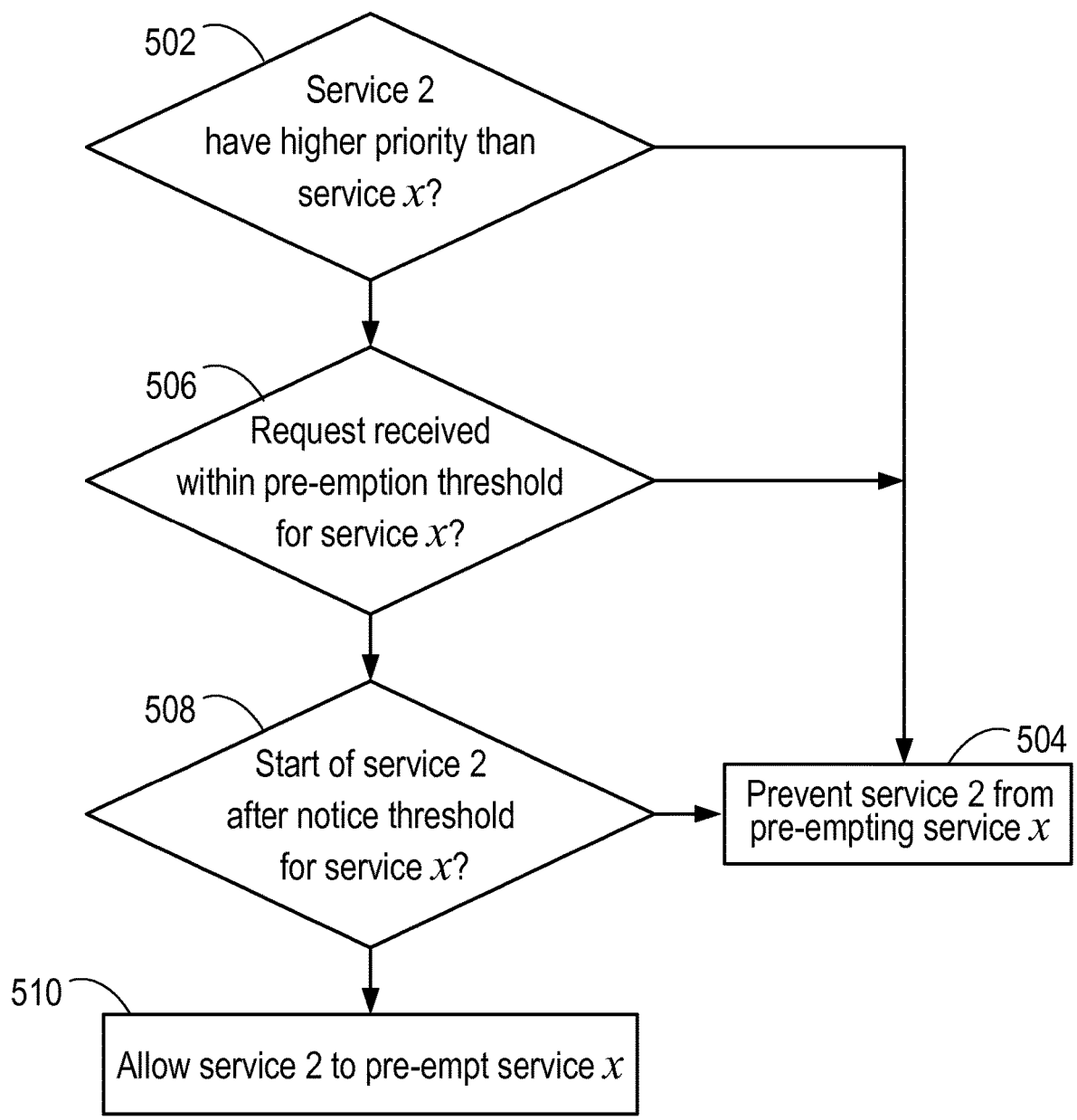
FIG. 5 is a flow chart of a method according to further embodiments of the disclosure.

FIG. 5 is a flowchart of a method according to embodiments of the disclosure, for determining whether a requested service (service 2) is allowed to pre-empt another service (service x) which is active or scheduled in the network. The method may be carried out in a PCE in a network node (such as a PNC 106 or MDSC 108). The network node may be a physical node or a virtual node (i.e. a virtual application running on a server). The method may be carried out as a sub-step to step 410, in which a path is computed for a newly requested service using pre-emption of one or more existing or scheduled services.

In step 502, the PCE determines whether service 2 is associated with a higher priority than service x. For example, service 2 may be associated with a setup priority value, and service x may be associated with a hold priority value. If service 2 does not have a higher priority than service x, the method proceeds to step 504 in which service 2 is prevented from pre-empting service x. That is, the resources being used or reserved for use by service x are not made available for the calculation of a path for service 2.

If it is determined that service 2 has a higher priority than service x, the process moves to step 506. Note that the case where service 2 has the same priority as service x has not been discussed here. This eventuality may be handled either by allowing pre-emption of service x (i.e. the method moving to step 506), or preventing it (i.e. moving to step 504).

In step 506, the PCE determines whether the request to schedule service 2 was received within a pre-emption threshold (i.e a first threshold) associated with service x. As noted in FIG. 2, the pre-emption threshold extends before the scheduled start time of service x. If the request to schedule service 2 is received during that threshold period of time (e.g. but before service x is active), then pre-emption of service x is prevented and the process moves to step 504. That is, the resources reserved for use by service x are not made available for the calculation of a path for service 2.

If the request to schedule service 2 is received before that threshold period of time, or if service x is already active, then the process moves to step 508 in which the PCE determines whether the requested start time of service 2 is a notice threshold period of time (i.e. a second threshold) after the request to schedule service 2 was received. As shown in FIG. 3, the notice period of time is associated with an existing, active service, and provides a period of time in which that existing service may not be pre-empted by newly requested services. If it is determined that service 2 is requested to start at a time which is less than the notice threshold period of time after the request to schedule service 2 is received, then pre-emption of service x by service 2 is prevented and the process moves to step 504. That is, the resources reserved for use by service x are not made available for the calculation of a path for service 2.

If it is determined that service 2 is requested to start at a time which is later than the notice threshold period of time after the request to schedule service 2 is received, or if service x is not yet active in the network, then pre-emption of service x by service 2 is allowed and the process moves to step 510. That is, the resources being used by service x or reserved for use by service x are made available for the calculation of a path for service 2.

Note that this process may be repeated for multiple or all services utilizing resources in the network, or multiple or all services utilizing resources which may be useful for the calculation of a path for service 2.

It will also be understood by those skilled in the art that the process shown in FIG. 5 may be carried out in any order. That is, steps 502, 506 and 508 (analysing priority values, pre-emption threshold and notice threshold respectively) may be carried out in any order. Further, steps 506 and 508 may be carried out independently of each other in some embodiments. That is, it may be determined whether service x is active or scheduled to be active. If it is determined that service x is active, only the notice threshold in step 508 may be applied. If it is determined that service x is scheduled but currently inactive, then only the pre-emption threshold in step 506 may be applied.

Thus FIGS. 4 and 5 describe a method by which a path may be computed for a newly requested service, and particularly define various parameters that may be used to remove resources already in use or already scheduled for use by other services from the path computation problem. Although this may make it less likely that a path can be found for the newly requested service, the path computation problem is simplified, and less disruption may be caused to services which are already active or already scheduled.

Figure 6:
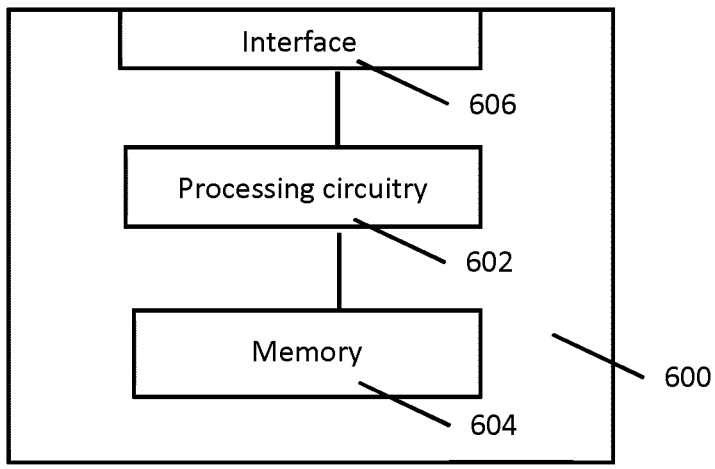
FIG. 6 is a schematic diagram of a network node according to embodiments of the disclosure.

FIG. 6 is a schematic drawing of a network node 600 according to embodiments of the disclosure. For example, the network node 600 may be a PNC or a MDSC, and may be physical or virtual. The network node 600 may be configured to perform the method of FIGS. 4 and 5.

The network node 600 comprises a processor 602 and a memory 604. The memory 604 contains instructions executable by the processor 602.

In one embodiment, the apparatus 600 is operable to: receive a request to schedule a second service utilizing the network in a second time period, wherein the second time period overlaps a first time period in which a first service utilizing the network has already been scheduled; and compute a path for the second service through the network. The network node 600 may be operable to compute the path for the second service through the network by: responsive to a determination that the request is received less than the threshold period of time before the start of the first time period, disallowing the second service from pre-empting the first service.

In another embodiment, the apparatus 604 is operable to: during a first time period in which a first service is active on the network, receive a request to schedule a second service utilizing the network in a second time period, wherein the second time period overlaps the first time period; and compute a path for the second service through the network. The network node 600 may be operable to compute the path for the second service through the network by: if the start of the second time period is less than the threshold period of time after the request was received, disallowing the second service from pre-empting the first service.

The apparatus further comprises an interface, 606, for connecting to the network and via said network to other elements of the network.

Figure 7:
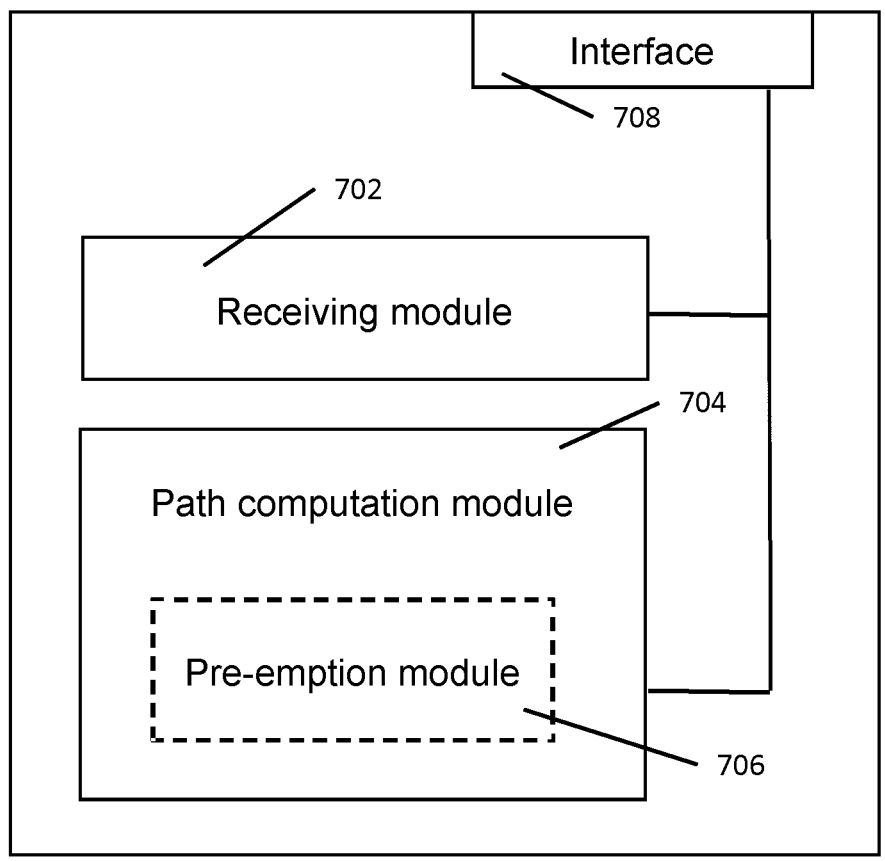
FIG. 7 is a schematic diagram of a network node according to further embodiments of the disclosure.

FIG. 7 is a schematic drawing of a network node 700 according to further embodiments of the disclosure. For example, the network node 700 may be a PNC or a MDSC, and may be physical or virtual. The network node 700 may be configured to perform the method of FIGS. 4 and 5.

The network node 700 comprises a receiving module 702 and a path computation module 704. The path computation module 704 may comprise a pre-emption module 706 configured to determine whether a first service is allowed to pre-empt a second service or not.

In one embodiment, the receiving module 702 is configured to receive a request to schedule a second service utilizing the network in a second time period, wherein the second time period overlaps a first time period in which a first service utilizing the network has already been scheduled. The path computation module 704 is configured to compute a path for the second service through the network. The path computation module 704 (or the pre-emption module 706) is configured to compute a path for the second service through the network by, responsive to a determination that the request is received less than the threshold period of time before the start of the first time period, disallowing the second service from pre-empting the first service.

In another embodiment, the receiving module 702 is configured to, during a first time period in which a first service is active on the network, receive a request to schedule a second service utilizing the network in a second time period, wherein the second time period overlaps the first time period. The path computation module 704 is configured to compute a path for the second service through the network. The path computation module (or the pre-emption module 706) is configured to compute the path for the second service through the network by, if the start of the second time period is less than the threshold period of time after the request was received, disallowing the second service from pre-empting the first service.

The apparatus further comprises an interface, 708, for connecting to the network and via said network to other elements of the network.

The present disclosure thus provides apparatus and methods for scheduling services in a traffic-engineered communications network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a path computation element for a traffic-engineered telecommunications network, the method comprising:
receiving a request to schedule a second service utilizing the network in a second time period, wherein the second time period overlaps a first time period in which a first service utilizing the network has already been scheduled; and
computing a path for the second service through the network,
wherein the step of computing the path for the second service through the network comprises:
determining that the request to schedule the second service is received less than a threshold period of time before the start of the first time period and disallowing the second service from pre-empting the first service.

2. The method according to claim 1, further comprising:
receiving a request to schedule a third service utilizing the network in a third time period, wherein the third time period overlaps the first time period; and
computing a path for the third service through the network,
wherein the step of computing the path for the third service through the network comprises:
determining that the request to schedule the third service is received more than the threshold period of time before the start of the first time period and allowing the third service to pre-empt the first service.

3. The method according to claim 2, wherein the step of computing the path for the third service through the network further comprises:

determining that the third service is associated with a higher priority than the first service and allowing the third service to pre-empt the first service; or determining that third service is associated with a lower priority than the first service and disallowing the third service from pre-empting the first service.

4. The method according to claim 2, wherein the step of computing a path for the third service comprises computing a path that pre-empts the first service, the method further comprising:

notifying a client for the first service that the first service has been pre-empted.

5. The method according to claim 1, wherein the threshold is associated with the first service.

6. The method according to claim 5, wherein the threshold is configured within a request to schedule the first service in the first time period, received by the path computation element.

7. The method according to claim 1, further comprising:

during the first time period in which the first service is active on the network, receiving a request to schedule a third service utilizing the network in a third time period, wherein the third time period overlaps the first time period; and computing a path for the third service through the network, wherein the step of computing the path for the third service through the network comprises:

determining that the start of the third time period is less than the second threshold period of time after the request to schedule the third service was received and disallowing the third service from pre-empting the first service.

8. A method in a path computation element for a traffic-engineered telecommunications network, the method comprising:

during a first time period in which a first service is active on the network, receiving a request to schedule a second service utilizing the network in a second time period, wherein the second time period overlaps the first time period; and computing a path for the second service through the network, wherein the step of computing the path for the second service through the network comprises:

determining that the start of the second time period is less than a threshold period of time after the request was received and disallowing the second service from pre-empting the first service.

9. The method according to claim 8, further comprising:

during the first time period in which the first service is active on the network, receiving a request to schedule a third service utilizing the network in a third time period, wherein the third time period overlaps the first time period; and computing a path for the third service through the network, wherein the step of computing the path for the third service through the network comprises:

determining that the start of the third time period is greater than the threshold period of time after the request was received and allowing the second service to pre-empt the first service.

10. The method according to claim 9, wherein the step of computing the path for the third service through the network comprises:

determining that the third service is associated with a higher priority than the first service and allowing the third service to pre-empt the first service; or determining that the third service is associated with a lower priority than the first service and disallowing the third service from pre-empting the first service.

11. The method according to claim 9, wherein the step of computing a path for the third service comprises computing a path that pre-empts the first service, the method further comprising:

notifying a client for the first service of pre-emption of the first service.

12. The method according to claim 11, further comprising:

notifying the client for the first service of the time at which the first service will end.

13. The method according to claim 9, wherein the request to schedule the third service comprises one or more constraints to be met by the path through the network, and wherein the step of computing the path for the third service comprises computing the path for the third service such that the one or more constraints are satisfied.

14. The method according to claim 8, wherein the threshold is associated with the first service.

15. Apparatus for a traffic-engineered telecommunications network, the apparatus comprising a processor and a memory, the memory containing instructions executable by the processor such that the apparatus is operable to:

receive a request to schedule a second service utilizing the network in a second time period, wherein the second time period overlaps a first time period in which a first service utilizing the network has already been scheduled; and compute a path for the second service through the network, wherein the apparatus is operable to compute the path for the second service through the network by:

determining that the request to schedule the second service is received less than a threshold period of time before the start of the first time period and disallowing the second service from pre-empting the first service.

16. Apparatus according to claim 15, wherein the apparatus is operable to:

receive a request to schedule a third service utilizing the network in a third time period, wherein the third time period overlaps the first time period; and compute a path for the third service through the network by:

determining that the request to schedule the third service is received more than the threshold period of time before the start of the first time period and allowing the third service to pre-empt the first service.

17. Apparatus according to claim 16, wherein the apparatus is operable to compute the path for the third service by:

determining that the third service is associated with a higher priority than the first service and allowing the third service to pre-empt the first service; or determining that the third service is associated with a lower priority than the first service and disallowing the third service from pre-empting the first service.

18. Apparatus according to claim 16, wherein the apparatus is operable to compute a path for the third service that pre-empts the first service, the apparatus being further operable to:

notify a client for the first service that the first service has been pre-empted.

19. Apparatus according to claim 15, wherein the apparatus is further operable to:
during the first time period in which the first service is active on the network, receive a request to schedule a third service utilizing the network in a third time period, wherein the third time period overlaps the first time period; and
compute a path for the third service through the network, wherein the apparatus is operable to compute the path for the third service by:
determining that the start of the third time period is less than the second threshold period of time after the request to schedule the third service was received and disallowing the third service from pre-empting the first service.

20. Apparatus according to claim 15, wherein a path computation element is implemented within a multi-domain service coordinator or a physical network controller.

21. Apparatus for a traffic-engineered telecommunications network, the apparatus comprising a processor and a memory, the memory containing instructions executable by the processor such that the apparatus is operable to:
during a first time period in which a first service is active on the network, receive a request to schedule a second service utilizing the network in a second time period, wherein the second time period overlaps the first time period; and
compute a path for the second service through the network,
wherein the apparatus is operable to compute the path for the second service through the network by:
determining that the start of the second time period is less than a threshold period of time after the request was received and disallowing the second service from pre-empting the first service.

22. Apparatus according to claim 21, wherein the apparatus is operable to:
during the first time period in which the first service is active on the network, receiving a request to schedule a third service utilizing the network in a third time period, wherein the third time period overlaps the first time period; and
computing a path for the third service through the network,
compute a path for the third service through the network by:
determining that the start of the third time period is greater than the threshold period of time after the request was received and allowing the third service to pre-empt the first service.

23. Apparatus according to claim 22, wherein the apparatus is operable to compute the path for the third service by:
determining that the third service is associated with a higher priority than the first service and allowing the third service to pre-empt the first service; or
determining that the third service is associated with a lower priority than the first service and disallowing the third service from pre-empting the first service.

24. Apparatus according to claim 22, wherein the apparatus is operable to compute a path for the third service that pre-empts the first service, the apparatus being further operable to:
notify a client for the first service of pre-emption of the first service.

* * * * *